(12) United States Patent
Wen et al.

(10) Patent No.: US 9,648,153 B2
(45) Date of Patent: May 9, 2017

(54) METHOD AND DEVICE FOR INCOMING CALL NOTIFICATION

(71) Applicant: Xiaomi Inc., Beijing (CN)

(72) Inventors: Zhenwei Wen, Beijing (CN); Ruijun Xu, Beijing (CN); Bo Zhang, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/063,995

(22) Filed: Mar. 8, 2016

(65) Prior Publication Data

US 2016/0269522 A1    Sep. 15, 2016

(30) Foreign Application Priority Data

Mar. 13, 2015    (CN) .......................... 2015 1 0111980

(51) Int. Cl.
| | |
|---|---|
| H04M 1/64 | (2006.01) |
| H04M 1/57 | (2006.01) |
| H04L 29/06 | (2006.01) |
| H04M 3/42 | (2006.01) |
| H04W 4/00 | (2009.01) |

(52) U.S. Cl.
CPC ........ *H04M 1/578* (2013.01); *H04L 65/1069* (2013.01); *H04L 65/1079* (2013.01); *H04L 65/1096* (2013.01); *H04M 3/42068* (2013.01); *H04W 4/008* (2013.01)

(58) Field of Classification Search
CPC .................................................... H04M 1/578
See application file for complete search history.

(56) References Cited

U.S. PATENT DOCUMENTS

| | | | | |
|---|---|---|---|---|
| 5,511,111 | A * | 4/1996 | Serbetcioglu | H04W 4/12 |
| | | | | 379/142.01 |
| 5,526,406 | A * | 6/1996 | Luneau | H04M 1/573 |
| | | | | 379/88.2 |
| 5,727,045 | A * | 3/1998 | Kim | H04M 1/663 |
| | | | | 379/372 |
| 5,745,562 | A * | 4/1998 | Penning | H04M 1/271 |
| | | | | 379/142.17 |
| 5,764,747 | A * | 6/1998 | Yue | H04M 3/42 |
| | | | | 379/142.07 |

(Continued)

FOREIGN PATENT DOCUMENTS

| | | |
|---|---|---|
| CN | 1364020 A | 8/2002 |
| CN | 1984160 A | 6/2007 |

(Continued)

OTHER PUBLICATIONS

International Search Report of PCT/CN2015/093050, mailed from the State Intellectual Property Office of China on Feb. 14, 2016.

(Continued)

*Primary Examiner* — Joseph T Phan
(74) *Attorney, Agent, or Firm* — Finnegan, Henderson, Farabow, Garrett & Dunner LLP

(57) ABSTRACT

A method for incoming call notification is disclosed. The method may comprise, when receiving an incoming call, determining voice identification information of the incoming call according to number information of the incoming call, and playing the voice identification information of the incoming call.

11 Claims, 8 Drawing Sheets

(56) References Cited

U.S. PATENT DOCUMENTS

| | | | | |
|---|---|---|---|---|
| 5,850,435 | A * | 12/1998 | Devillier | H04M 1/578 379/142.01 |
| 5,875,232 | A * | 2/1999 | Wolf | H04M 1/578 379/142.06 |
| 5,883,942 | A * | 3/1999 | Lim | H04M 1/274566 379/142.01 |
| 5,903,628 | A * | 5/1999 | Brennan | H04M 1/575 379/373.02 |
| 5,907,605 | A * | 5/1999 | Ramirez | H04M 3/04 379/376.01 |
| 5,999,599 | A * | 12/1999 | Shaffer | H04M 1/576 379/142.01 |
| 6,044,148 | A * | 3/2000 | Bleile | H04M 1/663 379/372 |
| 6,072,859 | A * | 6/2000 | Kong | H04M 19/041 379/142.01 |
| 6,108,630 | A * | 8/2000 | Kuechler | H04M 1/578 379/142.06 |
| 6,178,230 | B1 * | 1/2001 | Borland | H04M 1/578 379/153 |
| 6,178,232 | B1 * | 1/2001 | Latter | H04M 1/578 379/142.02 |
| 6,269,152 | B1 * | 7/2001 | Jursinski | H04M 1/663 379/67.1 |
| 6,332,021 | B2 * | 12/2001 | Latter | 379/142.01 |
| 6,385,303 | B1 * | 5/2002 | Peterson | H04M 1/56 379/207.15 |
| 6,728,354 | B1 | 4/2004 | Fleck et al. | |
| 7,224,792 | B2 * | 5/2007 | Fusco | H04M 1/578 379/373.01 |
| 7,257,221 | B2 * | 8/2007 | Shibao | H04M 3/02 379/142.06 |
| 7,426,269 | B2 * | 9/2008 | Heimbecher | H04M 19/041 379/373.01 |
| 7,590,229 | B2 * | 9/2009 | Bangor | H04M 3/42068 379/142.06 |
| 8,572,169 | B2 * | 10/2013 | Partovi | G06Q 10/10 709/204 |
| 9,319,528 | B2 * | 4/2016 | Diroo | H04M 3/537 |
| 2013/0053009 | A1 | 2/2013 | Yanai et al. | |
| 2013/0203390 | A1 | 8/2013 | Prokhorov | |

FOREIGN PATENT DOCUMENTS

| | | |
|---|---|---|
| CN | 101179618 A | 5/2008 |
| CN | 101193367 A | 6/2008 |
| CN | 101917506 A | 12/2010 |
| CN | 103024172 A | 4/2013 |
| CN | 103841123 A | 6/2014 |
| CN | 104199851 A | 12/2014 |
| CN | 104349324 A | 2/2015 |
| CN | 104702762 A | 6/2015 |

OTHER PUBLICATIONS

Extended European Search Report of European Patent Application No. 16159495.7, from the European Patent Office, dated Aug. 2, 2016.

* cited by examiner

200

201
Inquire Contact Information According To Number Information Of Incoming Call. If Contact Information Corresponding To Number Information Is Found, Voice Prompt Information Of Incoming Call Can Be Determined To Be First Voice Prompt Information.

202
If No Contact Information Corresponding To Number Of The Incoming Call Is Found, Inquire Yellow Page Information According To Number Information Of Incoming Call. If Yellow Page Information Corresponding To Number Information Is Found, Voice Prompt Information Of Incoming Call Can Be Determined To Be Second Voice Prompt Information.

203
If No Yellow Page Information Corresponding To Number Information Of Incoming Call Is Found, Inquire Identification Tag Information According To Number Information Of Incoming Call. If Identification Tag Information Corresponding To Number Information Is Found, Voice Prompt Information Of Incoming Call Can Be Determined To Be Third Voice Prompt Information.

204
Play Determined Voice Prompt Information Of Incoming Call

Fig. 2

METHOD AND DEVICE FOR INCOMING CALL NOTIFICATION

CROSS-REFERENCE TO RELATED APPLICATIONS

This application is based upon and claims priority to Chinese Patent Application No. 201510111980.7, filed Mar. 13, 2015, the entire contents of which are incorporated herein by reference.

TECHNICAL FIELD

The present disclosure generally relates to communication technologies, and more particularly, to a method and a device for incoming call notification.

BACKGROUND

Nowadays, spam calls have become a public nuisance. In order to prevent such calls, many security products emerge. For example, when a user receives a spam special software may assign a tag such as "telemarketing", "fraud" and the like to the incoming call, and the tag is uploaded to a cloud end server. When other users receive calls from the same number, the tag may be shown to them to filter such calls.

However, filtering by tags does not apply to all situations in practice, and thus it is important to improve the method to make it more applicable.

SUMMARY

One aspect of the present disclosure is directed to a method for incoming call notification. The method may comprise, when receiving an incoming call, determining voice identification information of the incoming call according to number information of the incoming call, and playing the voice identification information of the incoming call.

Another aspect of the present disclosure is directed to a device for incoming call notification. The device may comprise a processor and a memory for storing instructions executable by the processor. The processor may be configured to, when receiving an incoming call, determine voice identification information of the incoming call according to number information of the incoming call, and play the voice identification information of the incoming call.

Another aspect of the present disclosure is directed to a non-transitory computer-readable storage medium storing instructions that, when executed by a processor of a terminal device, cause the terminal device to perform a method for incoming call notification. The method may comprise, when receiving an incoming call, determining voice identification information of the incoming call according to number information of the incoming call, and playing the voice identification information of the incoming call.

It is to be understood that the foregoing general description and the following detailed description are exemplary and explanatory only, and are not restrictive of the invention, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the invention.

FIG. 2 is a flowchart illustrating another method for incoming call notification, according to an exemplary embodiment.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

The terminologies used herein are only for describing particular embodiments but not for limiting the present disclosure. The singular form words "a", "the", and "said" used in the present disclosure and append claims are intended to include plural form, unless otherwise clearly stated. Also, it shall be appreciated that the terminology "and/or" used herein refers to any or all combinations of one or more listed related items.

It shall be appreciated that although the present disclosure uses terminologies "first", "second", and "third" and the like to describe various information, the information shall not be limited by these terminologies. Using these terminologies is only for distinguishing information of the same type. For example, without departing from the scope of the present disclosure, the first information may be referred to as the second information, and similarly, the second information may be referred to as the first information. Depending on the context, the terminology "if" used herein may be interpreted as "when" or "in response to determining that".

In many scenarios, it is inconvenient for a user to look at a mobile phone screen, for example, when the user is driving a car and wearing a Bluetooth earphone. Even if an incoming call received is tagged as a spam call at a cloud end, the user may not see tag information of this incoming call, because the user may not see the screen of the mobile phone. Thus, the user may still answer this spam call.

In view of the above, the present disclosure proposes a method for incoming call notification. By this method, a voice play technology can be integrated with the incoming call identification technology. When an incoming call is received, voice identification information of the incoming call can be determined according to number information of the incoming call, and the voice identification information of the incoming call can be played. Thus, when the voice identification information carries the tag information corresponding to the number of the incoming call, a user may be informed of the tag even when the user cannot see the phone screen.

Figure 1:
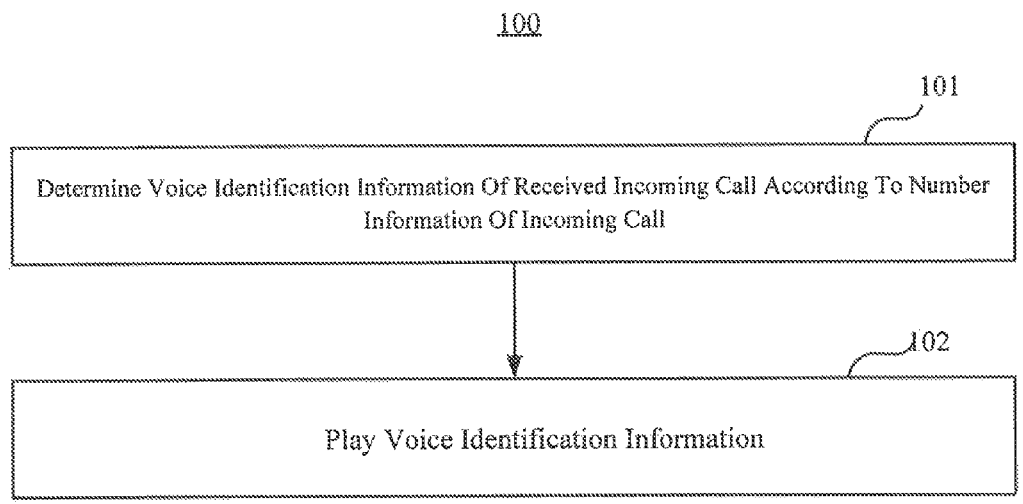
FIG. 1 is a flowchart illustrating a method for incoming call notification, according to an exemplary embodiment.

FIG. 1 is a flowchart illustrating a method 100 for incoming call notification, according to an exemplary embodiment. The method 100 can be performed by a terminal device and can include the following steps.

At step 101, voice identification information of a received incoming call is determined according to number information of the incoming call.

At step 102, the voice identification information is played.

In some exemplary embodiments, the terminal device may be a smart phone or a smart terminal device having a calling function. The technical solutions of the present disclosure described below in detail use the smart phone as an example. When the smart phone receives an incoming call, a phone call service on the smart phone can extract the number of the incoming call, locally perform user identification on the extracted number, and determine the voice identification information of the incoming call according to the user identification result.

When the phone call service on the smart phone performs user identification on the number of the incoming call, the number may be inquired respectively in a local address book, a yellow page database, and an identification tag database at a server end. When the number of the incoming call is inquired in the local address book, matching between the number and the local address book may be performed. If the number of the incoming call matches a contact in the local address book, the incoming call can be regarded as a normal incoming call, and basic information of the contact may be directly read out from the address book and may be displayed on the calling interface for the user. If the smart phone starts a cloud end address book function and the local address hook has been uploaded into the server end in advance, the above procedure for matching the number of the incoming call with the local address book may be performed at the cloud end server via networks.

If the number of the incoming call does not match any contact in the local address book, the incoming call can be regarded as an unknown incoming call. For an unknown incoming call, if the smart phone is locally installed with a yellow page database, the smart phone may further inquire contact information in the local yellow page database to determine whether the unknown incoming call's number is in the yellow page database. For example, the yellow page database usually includes commonly used public service numbers (such as service numbers of mobile operators, banks, large enterprises and organizations), the numbers of merchants which have passed real-name authentication, and the like. If the unknown incoming call's number is in the yellow page database, corresponding contact information may be directly read out from the yellow page database and may be displayed on the calling interface for the user. If the smart phone is not locally installed with the yellow page database, the above procedure for inquiring contact information in the yellow page database may be performed, via networks, at a server end installed with the yellow page database. In one embodiment, if the phone call service on the smart phone inquires the extracted number of the incoming call in the local address book and the yellow page database, and no contact information corresponding to the number is found, further steps are performed to determine whether the number of the incoming call carries an identification tag.

When determining whether the number of the incoming call carries the identification tag, an inquiry request carrying the number may be sent to a server end. After receiving the inquiry request, the server end may inquire in a local identification tag database to determine whether the number has been tagged by other users. If the number has been tagged by other users, the server end may return the tag to the smart phone as an inquiry result. The server end may be implemented as a security center providing security service for a user, and the security center may be a server, a server cluster, or a cloud platform.

When the smart phone receives the inquiry result returned by the server end, the smart phone may parse/analyze the inquiry result. If the inquiry result carries an identification tag, the phone call service of the smart phone determine that the number of the incoming call has been tagged by other users, and the number of the incoming call carries the identification tag. The identification tag database may be locally installed on the terminal device. For example, the terminal device may synchronize with the identification tag database of the server end. When no contact information of the number of the incoming call is found from the local address book and the yellow page database, the terminal device may further inquire from the locally synchronized identification tag database to determine whether the number of the incoming call carries an identification tag.

In one embodiment, when inquiries are respectively performed in the local address book, the yellow page database, and the identification tag database for the extracted number of the incoming call, and the number is successfully identified, voice identification information of the incoming call may be determined according to the identification result, and the determined voice identification information may be played. The voice identification information of the incoming call may be classified into different types in advance.

In some exemplary embodiments, the voice identification information can be played as voice prompt information. If the number of the incoming call matches a contact in a local address book, the voice prompt information (i.e., notification) of the incoming call can be determined to be first voice prompt information. The first voice prompt information may include contact information from the local address book. For example, after locally performing inquiries in the local address book for the extracted number of the incoming call, and if the number of the incoming call matches a contact in the local address book, the information of the contact may be directly read out from the local address hook, and a voice message "xxx is calling you" may be played.

If the number of the incoming call is in the yellow page database, the voice prompt information of the incoming call can be determined to be second voice prompt information. The second voice identification information may include the yellow page information of the number information. For example, if the number is in the local yellow page database, the information of the contact may be directly read out from the yellow page database, and a voice message "xxx company is calling you" may be played.

If the number of the incoming call does not match any contact information in the local address book and the yellow page database, and if it is found that the number corresponds to an identification tag by performing inquiries in the identification tag database, the voice prompt information of the incoming call can be determined to be third voice prompt information. The third voice prompt information may include the identification tag information. For example, if the number of the incoming call is 13100000000, and the identification tag of the number of the incoming call is "telemarketing", a voice message "call received from 13100000000 and could be telemarketing" can be played.

In some exemplary embodiments, if no contact information is found after performing inquiries in the local address book, the yellow page database, and the identification tag database for the number of the incoming call, the voice prompt information of the incoming call can be determined to be fourth voice prompt information. The fourth voice prompt information may only include the number information of the incoming call. For example, if the number of the incoming call is 13100000000, and if no contact information is found after performing inquiries in the local address book, the yellow page database, and the identification tag database, a voice message "13100000000 is calling you" may be played.

In one embodiment, when playing the voice identification information, the voice identification information may be first converted into a voice message, and the converted voice message may be played via a local audio output device (for example, a speaker or a telephone receiver in a smart phone). Alternatively, the converted voice message may be transmitted to an audio output peripheral (for example a Bluetooth earphone) via a pre-established audio path. Thus, when it is inconvenient for the user to view the screen of the mobile phone, and if the voice identification information includes the identification tag of the number of the incoming call, the identification tag may still be obtained.

In some exemplary embodiments, if the audio output peripheral is a Bluetooth earphone, and when transmitting media audio (STREAM_MEDIA) of the voice play information to the Bluetooth earphone, an audio path may need to be established between the Bluetooth earphone and the smart phone. The audio path between the Bluetooth earphone and the smart phone may be one of an Advanced Audio Distribution Profile (A2DP) path or a Synchronous Connection Oriented link (SCO) path.

The A2DP path may be applied in media audio transmission between Bluetooth devices and may have good audio effects. The transmission of the media audio of the voice play information via the A2DP path may be implemented by changing the audio routing of the Bluetooth in the original system of a smart phone into an A2DP path. However, since the original system of the smart phone needs to be changed, the implementation cost can be relatively high. The SCO path may be applied in call audio transmission between Bluetooth devices. The transmission of the media audio of the voice play information via the SCO path may be implemented by changing the media audio into call audio (STREAM_CALL). The transmission of media audio of the voice play information via the SCO path can be simple but may have degraded audio effects than the A2DP path.

In exemplary embodiments consistent with this disclosure, the voice play technology can be integrated with the incoming call identification technology. When an incoming call is received, voice identification information of the incoming call can be determined according to number information of the incoming call, and the voice identification information of the incoming call can be played. Thus, when the voice identification information carries the identification tag information corresponding to the number information of the incoming call, a user may obtain the identification tag even when it is inconvenient for the user to view the screen of a mobile phone.

FIG. 2 is a flowchart illustrating a method 200 for incoming call notification, according to an exemplary embodiment. The method 200 can be performed by a terminal device and can include the following steps.

At step 201, contact information is inquired according to number information of an incoming call. If contact information corresponding to the number information of the incoming call is found, voice prompt information of the incoming call can be determined to be first voice prompt information. The first voice prompt information may include the contact information corresponding to the number of the incoming call.

At step 202, if no contact information corresponding to the number of the incoming call is found, yellow page information can be inquired according to the number information of the incoming call. If yellow page information corresponding to the number information of the incoming call is found, the voice prompt information of the incoming call can be determined to be second voice prompt information. The second voice prompt information may include the yellow page information corresponding to the number information of the incoming call.

At step 203, if no yellow page information corresponding to the number information of the incoming call is found, identification tag information can be inquired according to the number information of the incoming call. If identification tag information corresponding to the number information of the incoming call is found, the voice prompt information of the incoming call can be determined to the third voice prompt information. The third voice prompt information may include the identification tag information corresponding to the number information of the incoming call.

At step 204, the determined voice prompt information of the incoming call is played.

In some exemplary embodiments, the terminal device may be a smart phone or a smart terminal device having a calling function. The technical solutions of the present disclosure described below in detail use the smart phone as an example.

When the smart phone receives an incoming call, the phone call service on the smart phone can extract the number of the incoming call, locally perform user identification on the extracted number, and determine voice identification information of the incoming call according to the user identification result.

When the phone call service on the smart phone performs user identification on the number of the incoming call, the number may be inquired respectively in a local address book, a yellow page database, and an identification tag database at a server end. When the number of the incoming call is inquired in the local address book, matching between the number and the local address book may be performed. If the number of the incoming call matches a contact in the local address book, the incoming call can be regarded as a normal incoming call, and the basic information of the contact may be directly read out from the address hook and may be displayed on the calling interface for the user. If the smart phone starts a cloud end address book function and the local address book has been uploaded into the server end in advance, the above procedure for matching the number of the incoming call with the local address book may be performed at the cloud end server via networks.

If the number of the incoming call does not match any contact in the local address hook, the incoming call can be regarded as an unknown incoming call. For an unknown incoming call, if the smart phone is locally installed with a yellow page database, the smart phone may further inquire the contact information in the local yellow page database to determine whether the unknown incoming call's number is in the yellow page database. For example, the yellow page database usually includes commonly used public service numbers (such as service numbers of mobile operators, banks, large enterprises and organizations), the numbers of merchants passed real-name authentication, and the like. If the unknown incoming call's number is in the yellow page database, corresponding contact information may be directly read out from the yellow page database and may be displayed on the calling interface for the user. If the smart phone is not locally installed with the yellow page database, the above procedure for inquiring contact information in the local yellow page database may be performed, via networks, at a server end installed with the yellow page database. In one embodiment, if the phone call service on the smart phone inquires the extracted number of the incoming call in the local address book and the yellow page database, and no contact information corresponding to the number is found, further steps are performed to determine whether the number of the incoming call carries an identification tag.

When determining whether the number of the incoming call carries the identification tag, an inquiry request carrying the number may be sent to a server end. After receiving the inquiry request, the server end may inquire in a local identification tag database to determine whether the number has been tagged by other users. If the number has been tagged by other users, the server end may return the tag to the smart phone as an inquiry result. The server end may be implemented as a security center providing security service for a user, and the security center may be a server, a server cluster, or a cloud platform.

When the smart phone receives the inquiry result returned by the server end, the smart phone may parse/analyze the inquiry result. If the inquiry result carries an identification tag, the phone call service of the smart phone may determine that the number of the incoming call has been tagged by other users, and the number of the incoming call carries the identification tag. The identification tag database may be locally installed on the terminal device. For example, the terminal device may synchronize with the identification tag database of the server end. When no contact information of the number of the incoming call is found from the local address book and the yellow page database, the terminal device may further inquire from the locally synchronized identification tag database to determine whether the number of the incoming call carries an identification tag.

In one embodiment, when inquiries are respectively performed in the local address book, the yellow page database, and the identification tag database for the extracted number of the incoming call, and the number is successfully identified, the voice identification information of the incoming call may be determined according to the identification result, and the determined voice identification information may be played. The voice identification information of the incoming call may be classified into different types in advance.

In some exemplary embodiments, the voice identification information may be played as voice prompt information. If the number of the incoming call matches a contact in a local address book, the voice prompt information (i.e., notification) of the incoming call can be determined to the first voice prompt information. The first voice prompt information may include contact information from the local address book. For example, after locally performing inquiries in the local address book for the extracted number of the incoming call, and if the number of the incoming call matches with a contact in the local address hook, the information of the contact may be directly read out from the local address book, and a voice message "xxx is calling you" may be played.

If the number of the incoming call is in the yellow page database, the voice prompt information of the incoming call can be determined to be second voice prompt information. The second voice identification information may include the yellow page information of the number information. For example, if the number is in the local yellow page database, the information of the contact may be directly read out from the yellow page database, and a voice message "xxx company is calling you" may be.

If the number of the incoming call does not match any contact information in the local, address hook and the yellow page database, and if it is found that the number corresponds to an identification tag by performing inquiries in the identification tag database, the voice prompt information of the incoming, call can be determined to be third voice prompt information. The third voice prompt information may include the identification tag information. For example, if the number of the incoming call is 13100000000, and the identification tag of the number of the incoming call is "telemarketing", a voice message "call received from 13100000000 and could be telemarketing" can be played.

In some exemplary embodiments, if no contact information is found after performing inquiries in the local address hook, the yellow page database, and the identification tag database for the number of the incoming call, the voice prompt information of the incoming call can be determined to be fourth voice prompt information. The fourth voice prompt information may only include the number information of the incoming call. For example, if the number of the incoming call is 13100000000, and if no contact information is found after performing inquiries in the local address hook, the yellow page database, and the identification tag database, a voice message "13100000000 is calling you" may be played.

In one embodiment, when playing the voice identification information, the voice identification information may be first converted into a voice message, and the converted voice message may be played via a local audio output device (for example, a speaker or a telephone receiver in a smart phone). Alternatively, the converted voice message may be transmitted to an audio output peripheral (for example a Bluetooth earphone) via a pre-established audio path. Thus, when it is inconvenient for the user to view the screen of the mobile phone, and if the voice identification information includes the identification tag of the number of the incoming call, the identification tag may still be obtained.

In some exemplary embodiments, if the audio output peripheral is a Bluetooth earphone, and when transmitting media audio (STREAK_MEDIA) of the voice play information to the Bluetooth earphone, an audio path may need to be established between the Bluetooth earphone and the smart phone. The audio path between the Bluetooth earphone and the smart phone may be one of an Advanced Audio Distribution Profile (A2DP) path or a Synchronous Connection Oriented link (SCO) path.

The A2DP path may be applied in media audio transmission between Bluetooth devices and may have good audio effects. The transmission of the media audio of the voice play information via the A2DP path may be implemented by changing the audio routing of the Bluetooth in the original system of a smart phone into an A2DP path. However, since the original system of the smart phone needs to be changed, the implementation cost can be relatively high. The SCO path may be applied in call audio transmission between Bluetooth devices. The transmission of the media audio of the voice play information via the SCO path may be implemented by changing the media audio into call audio (STREAM_CALL). The transmission of media audio of the voice play information via the SCO path can be simple but may have degraded audio effects than the A2DP path.

In exemplary embodiments consistent with this disclosure, the voice play technology can be integrated with the incoming call identification technology. When an incoming call is received, voice identification information of the incoming call can be determined according to number information of the incoming call, and the voice identification information of the incoming call can be played. Thus, when the voice identification information carries the identification tag information corresponding to the number information of the incoming call, a user may obtain the identification tag even when it is inconvenient for the user to view the screen of a mobile phone.

Consistent with the embodiments described above, the present disclosure further provides exemplary embodiments of devices that perform the methods for incoming call notification.

Figure 3:
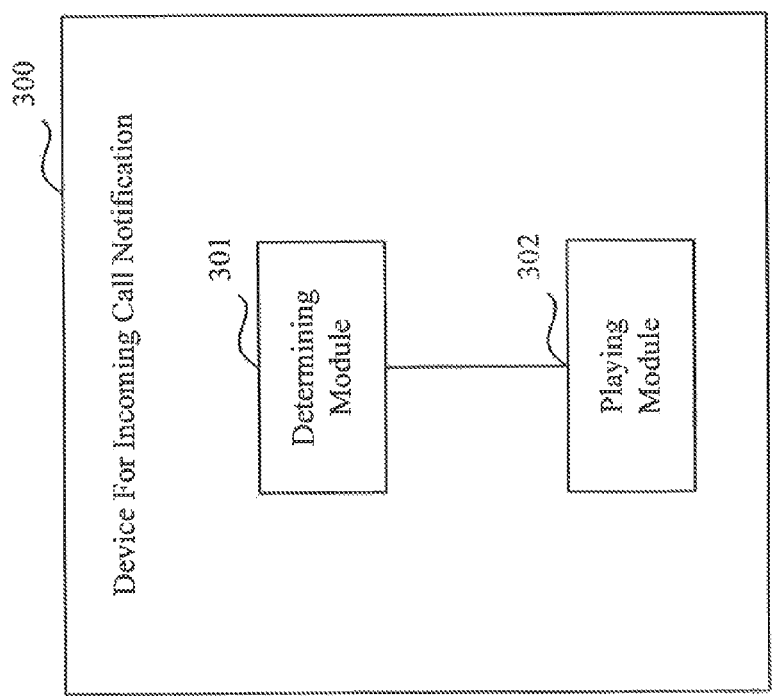
FIG. 3 is a block diagram illustrating a device for incoming call notification, according to an exemplary embodiment.

FIG. 3 is a block diagram illustrating a device 300 for incoming call notification, according to an exemplary embodiment.

The device 300 includes a determining module 301 and a playing module 302.

The determining module 301 is configured to, when an incoming call is received, determine voice identification information of the incoming call according to number information of the incoming call.

The playing module 302 is configured to play the voice identification information of the incoming call for a user.

In one embodiment, the voice identification information of the incoming call may include contact information, yellow page information, or identification tag information corresponding to the number information of the incoming call.

A voice play technology can be integrated with an incoming call identification technology. For example, when an incoming call is received, voice identification information of the incoming call can be determined according to number information of the incoming call, and the voice identification information of the incoming call can be played. Thus, if the voice identification information carries the identification tag information corresponding to the number information of the incoming call, a user may obtain the identification tag of the incoming call even when it is inconvenient for the user to view the screen of a mobile phone.

Figure 4:
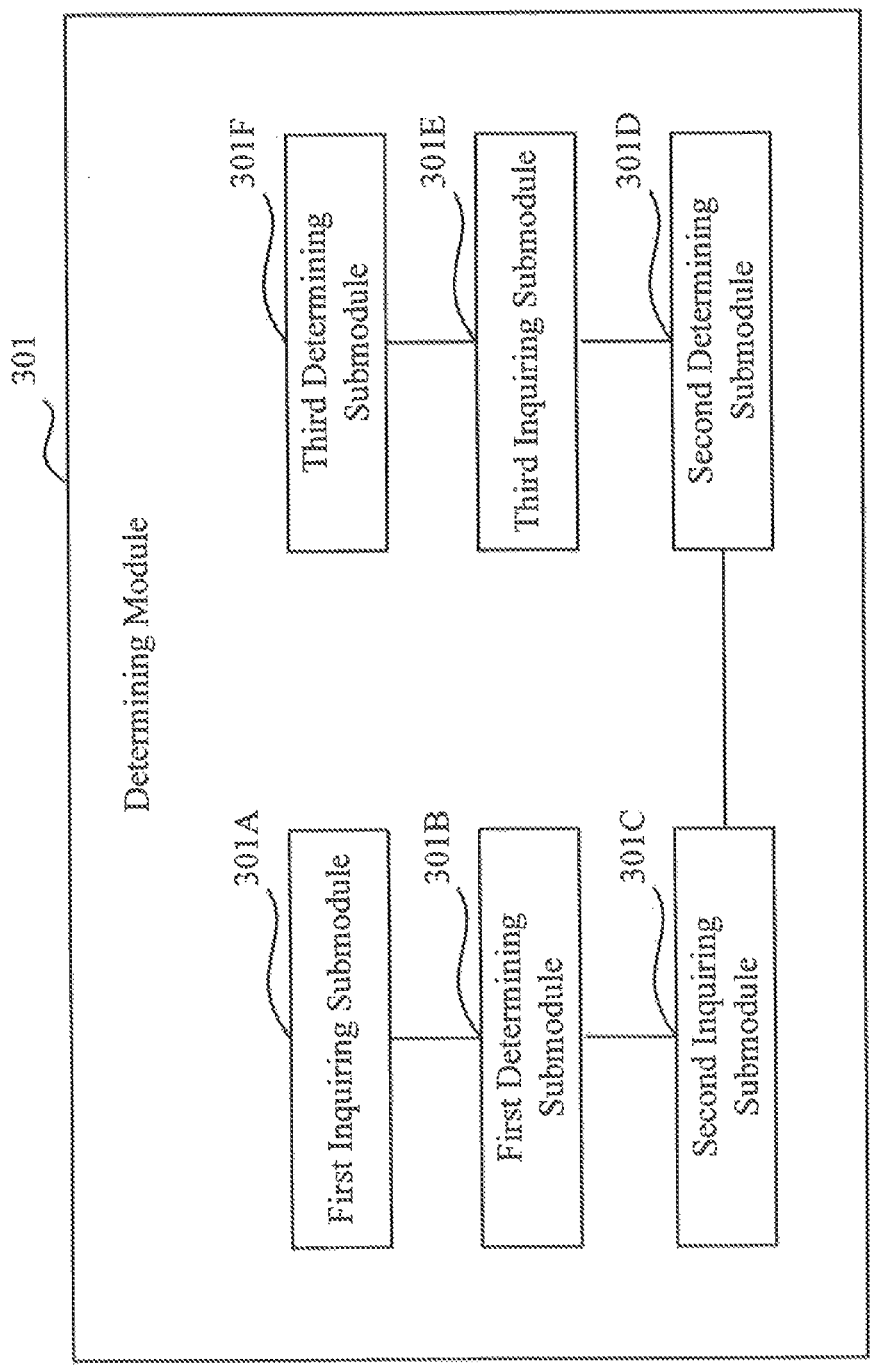
FIG. 4 is a block diagram illustrating a determining module, according to an exemplary embodiment.

FIG. 4 is a block diagram illustrating the determining module 301 (FIG. 3), according to an exemplary embodiment of the present disclosure. Referring to FIG. 4, the determining module 301 may include a first inquiring submodule 301A, a first determining submodule 301B, a second inquiring submodule 301C, a second determining submodule 301D, a third inquiring submodule 301E, and a third determining submodule 301F.

The first inquiring submodule 301A is configured to inquire contact information according to the number information of the incoming call.

The first determining submodule 301B is configured to, when contact information corresponding to the number information of the incoming call is found, determine the voice prompt information of the incoming call to be first voice prompt information including inquired contact information corresponding to the number of the incoming call.

The second inquiring submodule 301C is configured to, when no contact information corresponding to the number of the incoming call is found, inquire yellow page information of the number information of the incoming call.

The second determining submodule 301D is configured to, when yellow page information corresponding to the number information of the incoming call is found, determine the voice prompt information of the incoming call to the second voice prompt information including inquired yellow page information corresponding to the number information of the incoming call.

The third inquiring submodule 301E is configured to, when no yellow page information corresponding to the number information of the incoming call is found, inquire identification tag information according to the number information of the incoming call.

The third determining submodule 301F is configured to, when identification tag information corresponding to the number information of the incoming call is found, determine the voice prompt information of the incoming call to be third voice prompt information including the identification tag information.

Figure 5:
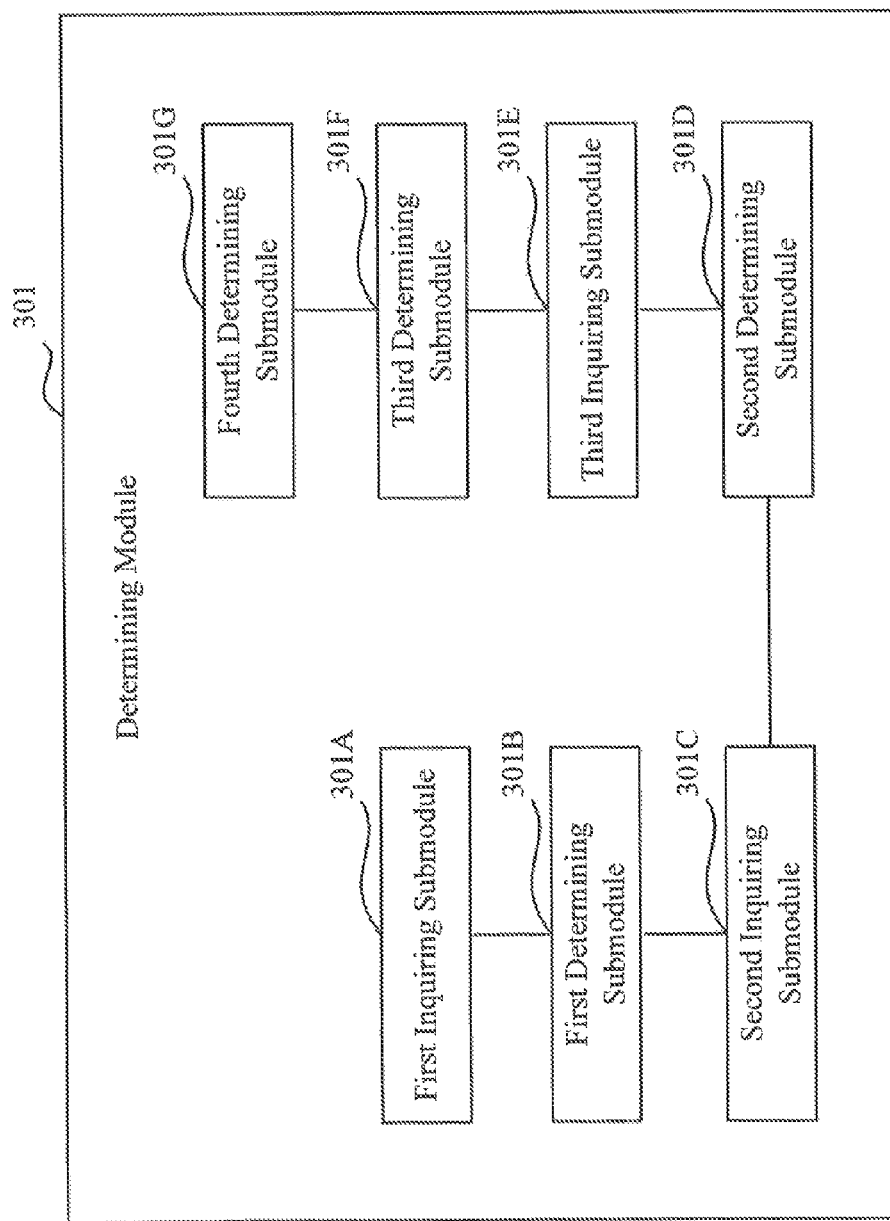
FIG. 5 is a block diagram illustrating a determining module, according to an exemplary embodiment.

FIG. 5 is a block diagram illustrating the determining module 301 (FIG. 4), according to an exemplary embodiment of the present disclosure. The determining module 301 may further include a fourth determining submodule 301G.

The fourth determining submodule 301G is configured to, when no identification tag information corresponding to the number information of the incoming call is found, determine the voice prompt information of the incoming call to the fourth voice prompt information including the number information of the incoming call.

Figure 6:
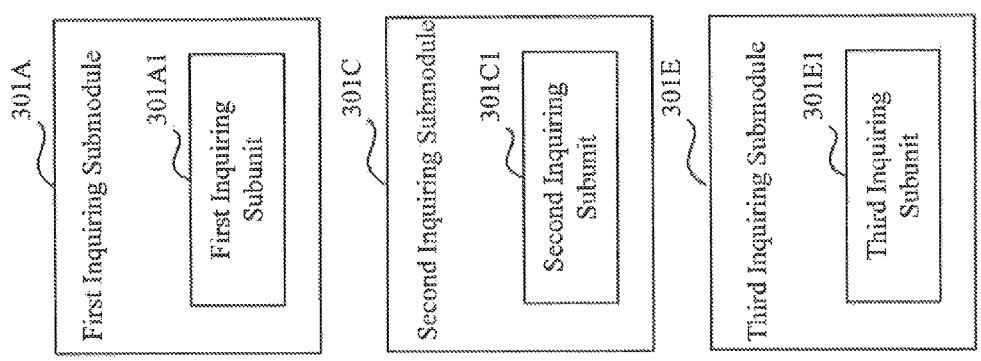
FIG. 6 shows block diagrams illustrating first, second, and third inquiring submodules, according to an exemplary embodiment.

FIG. 6 shows block diagrams illustrating the first inquiring submodule 301A, the second inquiring submodule 301O, and the third inquiring submodule 301E (FIG. 5), respectively, according to an exemplary embodiment of the present disclosure. Referring to FIG. 6, the first inquiring submodule 301A may include a first inquiring subunit 301A1, the second inquiring submodule 301C may include a second inquiring subunit 301C1, and the third inquiring submodule 301E may include a third inquiring subunit 301E1.

The first inquiring subunit 301A1 is configured to locally inquire the contact information, or to inquire the contact information at a server end via networks.

The second inquiring subunit 30101 is configured to locally inquire the yellow page information, or to inquire the yellow page information at a server end via networks.

The third inquiring subunit 301E1 is configured to locally inquire the identification tag information, or to inquire the identification tag information at a server end via networks.

The first inquiring subunit 301A1, the second inquiring subunit 301C1, and the third inquiring subunit 301E1 may also be included in the embodiments of devices device 300 and/or device 301.

Figure 7:
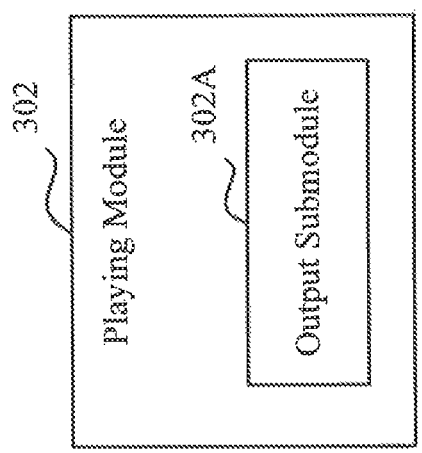
FIG. 7 is a block diagram illustrating a playing module, according to an exemplary embodiment.

FIG. 7 is a block diagram illustrating the playing module 302 (FIG. 3), according to an exemplary embodiment of the present disclosure. Referring to FIG. 7, the playing module 302 may include an output submodule 302A.

The output submodule 302A is configured to convert the voice identification information of the incoming call into a voice message, and to output the voice message to the user via a local audio output device, or to transmit the voice message to an audio output peripheral via a pre-established audio path.

In one embodiment, the audio output peripheral may include a Bluetooth earphone, and the pre-established audio path may include an A2DP path and a SCO path.

The embodiments of devices basically correspond to the embodiments of methods, and thus for related portions, the description of the embodiments of methods may be referred to as embodiments of the exemplary devices. The above described embodiments of devices are only illustrative, and portions described as separated modules may be or may not be physically separated, and the portions shown as respective modules may be or may not be physical modules, i.e., the portions may be located at one place, or may be distributed over a plurality of network modules. A part or whole of the modules may be selected to realize the objects of the technical solutions of the present disclosure according to actual requirements. One of ordinary skill in this art may understand and practice the technical solutions of the present disclosure without creative work.

The present disclosure further provides a device for incoming call notification, including: a processor; and a memory for storing instructions executable by the processor. The processor is configured to: when receiving an incoming call, determine voice identification information of the incoming call according to number information of the incoming call; and play the voice identification information of the incoming call.

Figure 8:
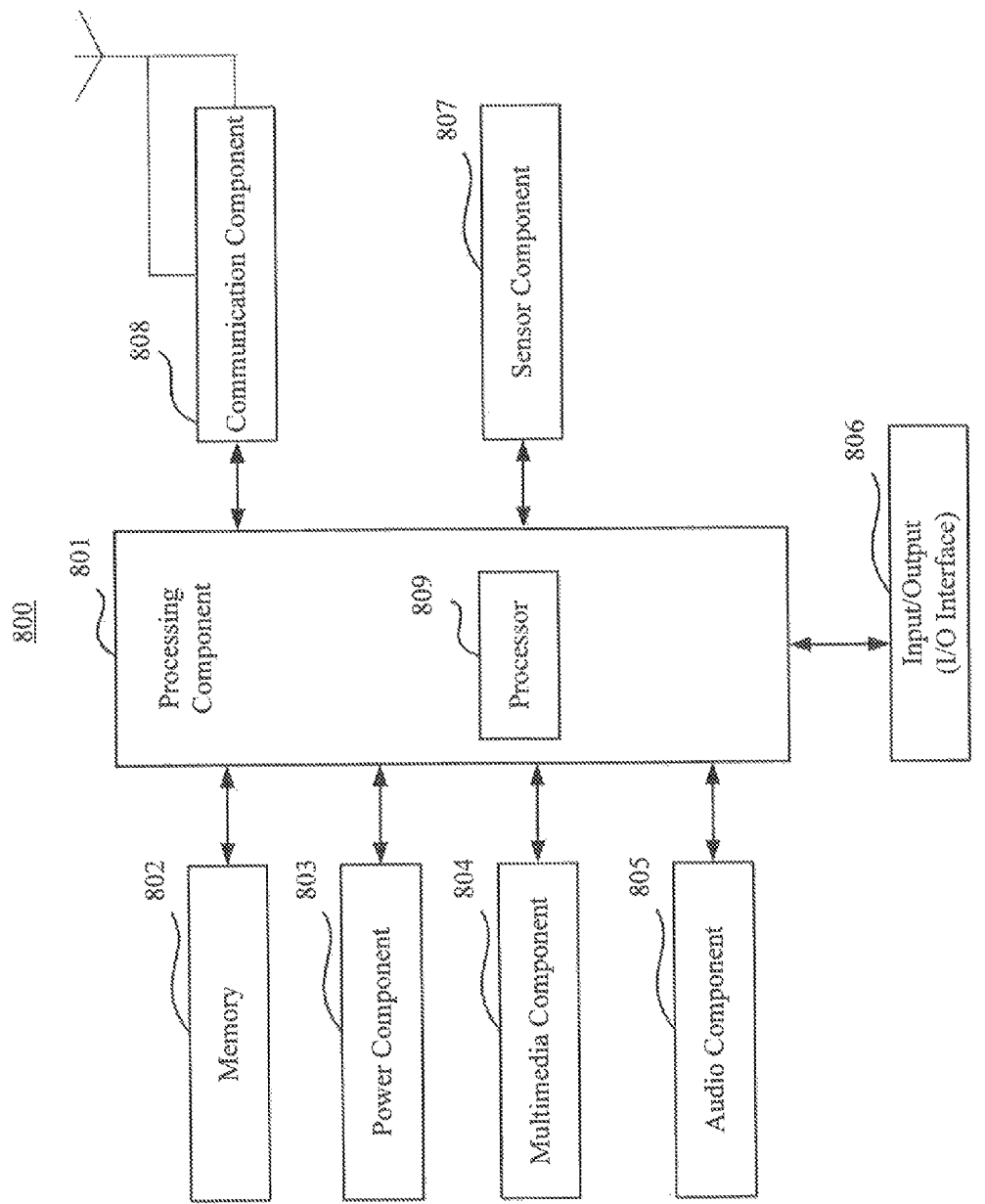
FIG. 8 is a block diagram illustrating another device for incoming call notification, according to an exemplary embodiment.

FIG. 8 is a block diagram illustrating a device 800 for incoming call notification, according to an exemplary embodiment.

For example, the device 800 may be a mobile phone, a computer, a digital broadcast terminal, a messaging device, a gaming console, a tablet, a medical device, exercise equipment, a personal digital assistant, and the like.

The device 800 may include one or more of the following components: a processing component 801, a memory 802, a power component 803, a multimedia component 804, an audio component 805, an input/output (I/O) interface 806, a sensor component 807, and a communication component 808.

The processing component 801 may control overall operations of the device 800, such as the operations associated with display, telephone calls, data communications, camera operations, and recording operations. The processing component 801 may include one or more processors 809 to execute instructions to perform all or part of the steps in the above described methods. Moreover, the processing component 801 may include one or more modules which facilitate the interaction between the processing component 801 and other components. For instance, the processing component 801 may include a multimedia module to facilitate the interaction between the multimedia component 804 and the processing component 801.

The memory 802 is configured to store various types of data to support the operation of the device 800. Examples of such data include, instructions for any applications or methods operated on the device 800, contact data, phonebook data, messages, pictures, video, etc. The memory 802 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 803 may provide power to various components of the device 800. The power component 803 may include a power management system, one or more power sources, and any other components associated with the generation, management, and distribution of power in the device 800.

The multimedia component 804 may include a screen providing an output interface between the device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but may also sense a period of time and a pressure associated with the touch or swipe action, in some embodiments, the multimedia component 804 may include a front camera and/or a rear camera. The front camera and the rear camera may receive external multimedia data while the device 800 is in an operation mode, such as a photographing mode or a video mode. Each of the front camera and the rear camera may be a fixed optical lens system or have focus and optical zoom capability.

The audio component 805 may be configured to output and/or input audio signals. For example, the audio component 805 may include a microphone configured to receive an external audio signal when the device 800 is in an operation mode, such as a call mode, a recording mode, and a voice recognition mode. The received audio signal may be further stored in the memory 802 or be transmitted via the communication component 808. In some embodiments, the audio component 805 may further include a speaker to output audio signals.

The I/O interface 806 may provide an interface between the processing component 801 and peripheral interface modules, such as a keyboard, a click wheel, buttons, and the like. The buttons may include, but are not limited to, a home button, a volume button, a starting button, and a locking button.

The sensor component 807 may include one or more sensors to provide, status assessments of various aspects of the device 800. For instance, the sensor component 807 may detect an open/closed status of the device 800, relative positioning of components, e.g., the display and the keypad, of the device 800, a change in position of the device 800, or a component of the device 800, a presence or absence of user contact with the device 800, an orientation or an acceleration/deceleration of the device 800, and a change in temperature of the device 800. The sensor component 807 may include a proximity sensor configured to detect the presence of nearby objects without any physical contact. The sensor component 807 may also include a light sensor, such as a CMOS or CCD image sensor, for use in imaging applications. In some embodiments, the sensor component 807 may also include an accelerometer sensor, a gyroscope sensor, a magnetic sensor, a pressure sensor, or a temperature sensor.

The communication component 808 may be configured to facilitate communication, wired or wirelessly, between the device 800 and other devices. The device 800 can access a wireless network based on a communication standard, such as WiFi, 2G, or 3G, or a combination thereof. In one exemplary embodiment, the communication component 808 receives a broadcast signal or broadcast associated information from an external broadcast management system via a broadcast channel. In one exemplary embodiment, the communication component 808 may further include a near field communication (NFC) module to facilitate short-range communications. For example, the NFC module may be implemented based on a radio frequency identification (MD) technology, an infrared data association (IrDA) technology, an ultra-wideband (UWB) technology, a Bluetooth (BT) technology, and other technologies.

In some exemplary embodiments, the device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 802, executable by the processor 809 in the device 800, for performing the above-described methods. For example, the non-transitory computer-readable storage medium may be a ROM, a RAM, a CD-ROM, a magnetic tape, a floppy disc, an optical data storage device, and the like.

When executed by a processor of a mobile terminal, the instructions stored in the storage medium may cause the mobile terminal to perform a method for incoming call notification, the method including: when receiving an incoming call, determining voice identification information of the incoming call according to number information of the incoming call; and playing the voice identification information of the incoming call.

One of ordinary skill in the art will understand that the above described modules can each be implemented by hardware, or software, or a combination of hardware and software. One of ordinary skill in the art will also understand that multiple ones of the above described modules may be combined as one module, and each of the above described modules may be further divided into a plurality of submodules.

Other embodiments of the invention will be apparent to those skilled in the art from consideration of the specification and practice of the present disclosure. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for incoming call notification, comprising:
when receiving an incoming call, determining voice identification information of the incoming call according to number information of the incoming call; and
playing the voice identification information of the incoming call,
wherein the determining of the voice identification information of the incoming call includes:
inquiring contact information according to the number information of the incoming call;
when contact information corresponding to the number information of the incoming call is found, determining the voice identification information to be first voice prompt information of the incoming call, the first voice prompt information including the contact information corresponding to the number information of the incoming call;
when no contact information corresponding to the number information of the incoming call is found, inquiring yellow page information according to the number information of the incoming call;
when yellow page information corresponding to the number information of the incoming call is found, determining the voice identification information to be second voice prompt information of the incoming call, the second voice prompt information including the yellow page information corresponding to the number information of the incoming call;
when no yellow page information corresponding to the number information of the incoming call is found, inquiring identification tag information according to the number information of the incoming call; and
when identification tag information corresponding to the number information of the incoming call is found, determining the voice identification information to be third voice prompt information of the incoming call, the third voice prompt information including the identification tag information corresponding to the number information of the incoming call.

2. The method according to claim 1, further comprising:
when no identification tag information corresponding to the number information of the incoming call is found, determining the voice identification information to be fourth voice prompt information of the incoming call, the fourth voice prompt information including the number information of the incoming call.

3. The method according to claim 1, wherein inquiring the contact information, the yellow page information, or the identification tag information according to the number information of the incoming call comprises at least one of:
locally inquiring the contact information, the yellow page information, or the identification tag information; or
inquiring the contact information, the yellow page information, or the identification tag information at a server end via a network.

4. The method according to claim 1, wherein playing the voice identification information of the incoming call comprises:
converting the voice identification information of the incoming call into a voice message; and
outputting the voice message via a local audio output device, or transmitting the voice message to an audio output peripheral via a pre-established audio path.

5. The method according to claim 4, wherein:
the audio output peripheral comprises a Bluetooth earphone, and
the pre-established audio path comprises one of an Advanced Audio Distribution Profile (A2DP) path or a Synchronous Connection Oriented link (SCO) path.

6. A device for incoming call notification, comprising:
a processor; and
a memory for storing instructions executable by the processor,
wherein the processor is configured to:
when receiving an incoming call, determine voice identification information of the incoming call according to number information of the incoming call; and
play the voice identification information of the incoming call,
wherein the determining of the voice identification information of the incoming call includes:
inquiring contact information according to the number information of the incoming call;

when contact information corresponding to the number information of the incoming call is found, determining the voice identification information to be first voice prompt information of the incoming call, the first voice prompt information including the contact information corresponding to the number information of the incoming call;

when no contact information corresponding to the number information of the incoming call is found, inquiring yellow page information according to the number information of the incoming call;

when yellow page information corresponding to the number information of the incoming call is found, determining the voice identification information to be second voice prompt information of the incoming call, the second voice prompt information including the yellow page information corresponding to the number information of the incoming call;

when no yellow page information corresponding to the number information of the incoming call is found, inquiring identification tag information according to the number information of the incoming call; and when identification tag information corresponding to the number information of the incoming call is found, determining the voice identification information to be third voice prompt information of the incoming call, the third voice prompt information including the identification tag information corresponding to the number information of the incoming call.

7. The device according to claim 6, wherein the processor is further configured to:

when no identification tag information corresponding to the number information of the incoming call is found, determine the voice identification information to be fourth voice prompt information of the incoming call, the fourth voice prompt information including the number information.

8. The device according to claim 6, wherein the processor is further configured to:

locally inquire the contact information, the yellow page information, or the identification tag information, or inquire the contact information, the yellow page information, or the identification tag information at a server end via a network.

9. The device according to claim 6, wherein the processor is further configured to:

convert the voice identification information of the incoming call into a voice message; and output the voice message via a local audio output device, or transmit the voice message to an audio output peripheral via a pre-established audio path.

10. The device according to claim 9, wherein:

the audio output peripheral comprises a Bluetooth earphone, and the pre-established audio path comprises one of an Advanced Audio Distribution Profile (A2DP) path or a Synchronous Connection Oriented link (SCO) path.

11. A non-transitory computer-readable storage medium storing instructions that, when executed by a processor of a terminal device, cause the terminal device to perform a method for incoming call notification, the method comprising:

when receiving an incoming call, determining voice identification information of the incoming call according to number information of the incoming call; and playing the voice identification information of the incoming call, wherein the determining of the voice identification information of the incoming call includes:

inquiring contact information according to the number information of the incoming call;

when contact information corresponding to the number information of the incoming call is found, determining the voice identification information to be first voice prompt information of the incoming call, the first voice prompt information including the contact information corresponding to the number information of the incoming call;

when no contact information corresponding to the number information of the incoming call is found, inquiring yellow page information according to the number information of the incoming call;

when yellow page information corresponding to the number information of the incoming call is found, determining the voice identification information to be second voice prompt information of the incoming call, the second voice prompt information including the yellow page information corresponding to the number information of the incoming call;

when no yellow page information corresponding to the number information of the incoming call is found, inquiring identification tag information according to the number information of the incoming call; and when identification tag information corresponding to the number information of the incoming call is found, determining the voice identification information to be third voice prompt information of the incoming call, the third voice prompt information including the identification tag information corresponding to the number information of the incoming call.

* * * * *